United States Patent [19]
Schierbeek et al.

[11] Patent Number: 5,812,321
[45] Date of Patent: Sep. 22, 1998

[54] AUTOMATIC SENSITIVITY ADJUSTMENT FOR ELECTRO-OPTIC MIRROR AND HEADLIGHT ACTIVATION CONTROL

[75] Inventors: Kenneth L. Schierbeek, Zeeland; Robert J. Dykhouse, Byron Center; Niall R. Lynam, Holland, all of Mich.

[73] Assignee: Donnelly Corporation, Holland, Mich.

[21] Appl. No.: 637,828

[22] Filed: Apr. 25, 1996

Related U.S. Application Data

[63] Continuation-in-part of Ser. No. 277,674, Jul. 19, 1994, abandoned.

[51] Int. Cl.$^6$ .............................. G02B 27/00; G02B 5/08; G01J 1/20; H04Q 9/14
[52] U.S. Cl. .......................... 359/601; 359/603; 359/604; 250/200; 250/201.1; 307/9.1; 307/10.1
[58] Field of Search ...................................... 359/601, 603, 359/604; 250/200, 201.1, 203.4; 307/9.1, 10.1; 315/82

[56] References Cited

U.S. PATENT DOCUMENTS

| | | | |
|---|---|---|---|
| 3,601,614 | 8/1971 | Platzer, Jr. | 250/214 AL |
| 3,963,940 | 6/1976 | Adamian | 307/10 |
| 4,097,778 | 6/1978 | Ludwig | 315/82 |
| 4,208,615 | 6/1980 | Jones et al. | 315/83 |
| 4,236,099 | 11/1980 | Rosenblum | 315/83 |
| 4,249,160 | 2/1981 | Chilvers | 340/902 |
| 4,301,390 | 11/1981 | Earle | 315/82 |
| 4,357,558 | 11/1982 | Massoni et al. | 315/83 |
| 4,443,057 | 4/1984 | Bauer et al. | 359/606 |
| 4,580,875 | 4/1986 | Bechtel et al. | 359/604 |
| 4,727,290 | 2/1988 | Smith et al. | 315/824 |
| 4,793,690 | 12/1988 | Gahan et al. | 359/604 |
| 4,831,310 | 5/1989 | Heintzberger et al. | 315/77 |
| 4,886,960 | 12/1989 | Molyneux et al. | 250/209 |
| 4,896,030 | 1/1990 | Miyaji | 250/201 |
| 4,896,075 | 1/1990 | Earle | 315/82 |
| 5,072,154 | 12/1991 | Chen | 315/237 R |
| 5,122,647 | 6/1992 | Lynam et al. | 250/201.1 |
| 5,124,549 | 6/1992 | Michaels et al. | 250/237 R |
| 5,148,014 | 9/1992 | Lynam et al. | 250/214 AL |
| 5,182,502 | 1/1993 | Slotkowski et al. | 315/159 |
| 5,193,029 | 3/1993 | Schofield et al. | 359/604 |
| 5,253,109 | 10/1993 | O'Farrell et al. | 359/604 |
| 5,329,206 | 7/1994 | Slotkowski et al. | 315/82 |
| 5,397,923 | 3/1995 | Christensen | 307/9.1 |
| 5,451,822 | 9/1995 | Bechtel et al. | 307/9.1 |
| 5,550,677 | 8/1996 | Schofield et al. | 359/601 |

FOREIGN PATENT DOCUMENTS

0426503 A1   11/1990   European Pat. Off.

*Primary Examiner*—Paul M. Dzerzynski
*Assistant Examiner*—Mohammad Y. Sikder
*Attorney, Agent, or Firm*—Van Dyke, Gardner, Linn & Burkhart, LLP

[57] ABSTRACT

A light-responsive vehicle control system is provided that is useful in the passenger compartment of a vehicle having a movable top, or cover, which may be opened to at least partially uncover the passenger compartment. The control system includes at least one control circuit which receives an input from the light sensor and produces an output to operate a device, such as an electro-optic mirror or the vehicle headlights, as a function of the light sensed by the light sensor and a sensitivity value. The control circuit is responsive to the position of the cover with respect to the passenger compartment to reduce the sensitivity level when the compartment is uncovered. The control circuit may filter a signal that is a function of light sensed by the light sensor according to a time-constant and be responsive to a reduction in the light level sensed by the light sensor to reduce the value of the time-constant. If the controlled device is the vehicle headlights, the headlights may be more rapidly actuated during an abrupt reduction in sensed light levels as may occur when entering a tunnel or the like.

62 Claims, 8 Drawing Sheets

AUTOMATIC SENSITIVITY ADJUSTMENT FOR ELECTRO-OPTIC MIRROR AND HEADLIGHT ACTIVATION CONTROL

CROSS-REFERENCE TO RELATED APPLICATION

This application is a continuation-in-part of application Ser. No. 08/277,674, filed Jul. 19, 1994, for an AUTOMATIC REARVIEW MIRROR SYSTEM WITH AUTOMATIC HEADLIGHT ACTIVATION by Kenneth L. Schierbeek and Niall R. Lynam and abandoned on Feb. 11, 1997.

BACKGROUND OF THE INVENTION

This invention relates generally to a vehicle control and, in particular, a light-responsive vehicle control which produces an output to operate a device as a function of light sensed by a light sensor. More particularly, the present invention relates to a control for establishing the partial reflectance level of an electro-optic rearview mirror and a headlight activation control for activating a vehicle's headlights at low light conditions and deactivating the vehicle's headlights at high light conditions.

Light-responsive vehicle controls may include one or more light sensors which sense light conditions from within the vehicle passenger compartment. At least one of the light sensors may be directed in a particular direction, such as rearward of the vehicle. The control receives an input from the light sensor, or sensors, and produces an output to operate a device as a function of the light sensed and a sensitivity value. The sensitivity value may be manually set, as by a user operator control, or may be set internally in the control either at a fixed level or at a variable level established by the control. In addition to light sensors directed rearward of the vehicle, light sensors may be directed upwardly or in other directions within the passenger compartment.

In a conventional electro-optic mirror control system, a control may be responsive to more than one light sensor. For example, a control may respond to two light sensors, such as a generally forward-facing light sensor and a generally rearward-facing light sensor. The rearward-facing light sensor is more sensitive to glare, reflected by the rearview mirror into the driver's eyes, produced from light sources rearward of the vehicle. One such control is disclosed in commonly assigned United States patent application Ser. No. 08/277,674 for an AUTOMATIC REARVIEW MIRROR SYSTEM WITH AUTOMATIC HEADLIGHT ACTIVATION filed Jul. 19, 1994, by Kenneth L. Schierbeek and Niall R. Lynam and abandoned on Feb. 11, 1997, the disclosure of which is hereby incorporated herein by reference. Such control includes a pair of light sensors, one directed generally forward of the vehicle and one directed generally rearwardly of the vehicle. The control responds to the light levels to which the light sensors are exposed in order to produce a drive signal to establish a partial reflectance level for an electro-optic mirror element and in order to produce a headlight activation signal in order to switch the vehicle headlights between an activated and a deactivated condition. In this manner, both the condition of the vehicle headlights, as well as the partial reflectance level of the electro-optic mirror, are established as a function of the light levels to which the light sensors are exposed.

One difficulty arises when the configuration of the vehicle is subject to modification, as it applies to light entering the passenger compartment, such as occurs when all, or a portion, of the roof of the vehicle is a movable cover. One such movable cover is a convertible top which, when opened, substantially completely uncovers the top of the vehicle passenger compartment. Another such movable cover is a sunroof which partially uncovers the top of the passenger compartment when opened. Light-responsive vehicle controls having light sensors typically utilize portions of the passenger compartment enclosure in order to reduce the amount of light sensed by the light sensor. For example, a rearward-facing light sensor will not receive all of the light rearward of a vehicle. The roof and other portions defining the passenger compartment, such as the roof-supporting pillars, tend to restrict light reaching a rearward-facing sensor. This may be advantageous by allowing a relatively wide field of view sensor to be utilized in order to detect sources of glare on both sides, as well as the rear, of the vehicle.

A vehicle equipped with a movable roof, such as a convertible top, or a sunroof, changes configuration when the cover is opened. This effect is particularly acute with a convertible top. When a convertible top is moved from a position covering the passenger compartment to a position in which the passenger compartment is open, light-responsive vehicle controls, having light sensors within the passenger compartment, no longer respond to light in the same manner. Although this effect is most profound in a convertible top vehicle, a similar effect may be experienced with a sunroof which is moved from a closed to an open position.

An additional difficulty with light-responsive vehicle controls, particularly controls which are intended to respond to ambient light conditions around the vehicle, is that the light-responsive signal is typically filtered according to a long time-constant, on the order of several tens of seconds. Such signal may be used, for example, to actuate the vehicle's headlights in low lighting conditions and to deactuate the headlights in higher lighting conditions. This allows the control to essentially ignore fluctuations in detected light signals, such as may occur when the vehicle passes under an overhead bridge, or the like. This long time-constant provides a difficulty for a light-responsive vehicle control which controls the activation of the vehicle's headlights. Under normal operating conditions, the gradual change in light at dusk is suitably responded to by the headlight activation control in switching the headlights from a deactuated to an activated state or from a daytime-running light condition to a nighttime-running light condition. One difficulty arises, however, when the vehicle enters a tunnel or the like. Many tunnels, especially ones built a long time ago, often have poor lighting. Therefore, the requirement of several tens of seconds to respond to the lower light level of the tunnel, prior to switching the vehicle's headlights to a nighttime condition, is not an acceptable response and may result in the vehicle being operated for an extended period with inadequate lighting of the road.

SUMMARY OF THE INVENTION

The present invention provides a light-responsive vehicle control which overcomes the difficulties of prior art light-responsive vehicle controls. The present invention is especially useful with light-responsive vehicle controls which produce an electro-optic mirror drive signal in order to establish a partial reflectance level of the vehicle's mirror or mirrors. The invention is also useful in light-responsive vehicle controls which control the activation state of the vehicle's headlights.

A light-responsive vehicle control provided according to the invention is useful with a vehicle having a passenger compartment and a cover which selectively covers at least a portion of the passenger compartment. A light-responsive vehicle control, according to the invention, includes at least one light sensor within the passenger compartment and a control receiving an input from the light sensor and producing an output to operate a device. This output may be a function at least of the light sensed by the light sensor and a sensitivity value. According to an aspect of the invention, the control is responsive to the position of the cover with respect to the passenger compartment to adjust the sensitivity value. Typically, the control reduces the sensitivity value in response to the cover being in a position uncovering the passenger compartment.

A vehicle headlight activation system according to another aspect of the invention is provided for activating a vehicle's headlights at low light conditions and deactivating the vehicle's headlights at high light conditions. Such system according to this aspect of the invention includes at least one light sensor and a control which receives an input from the light sensor and produces an output to operate the vehicle's headlights according to a time-filtered signal that is a function of the sensed light. The signal is filtered according to a time-constant in producing the output. The control responds to a reduction in the light level sensed by the light sensor to reduce the value of the time-constant. This allows the control to respond quickly to rapid decreases in light levels around the vehicle in order to switch the vehicle's headlights to a low light condition, such as may occur when the vehicle enters a tunnel or the like.

A vehicle automatic rearview mirror system is provided, according to an additional aspect of the invention, which establishes a reflectivity level of an electro-optic rearview mirror element positioned in a passenger compartment, in which the passenger compartment has a portion which is selectively covered by a cover. The control includes at least one, and preferably a pair, of light sensors within the passenger compartment, at least one of the sensors facing generally rearwardly of the vehicle. A control is provided which receives input from the light sensors and produces a drive signal establishing a partial reflectance level of the electro-optic mirror element. The drive signal is a function of the light sensed by the light sensors and a sensitivity value. The control is responsive to the position of the cover with respect to the passenger compartment to adjust the sensitivity value.

A vehicle headlight activation system for activating a vehicle's headlights at low ambient light conditions and deactivating the headlights at high ambient light conditions in a vehicle including a passenger compartment having a portion which is selectively covered by a cover, according to another aspect of the invention, includes at least one light sensor within the passenger compartment and a control. The control receives an input from the light sensor to produce an output to operate the vehicle headlights as a function at least of light sensed by the light sensor and a sensitivity level. The control is responsive to the position of the cover with respect to the passenger compartment to adjust the sensitivity value.

A light-responsive vehicle control for a vehicle having a passenger compartment and a cover selectively covering at least a portion of the passenger compartment, according to another aspect of the invention, includes at least one light sensor within the passenger compartment directed generally rearwardly of the vehicle and a control which receives an input from the light sensor and produces an output to operate a device as a function of the light sensed by the light sensor. According to this aspect of the invention, a surface is provided defining an aperture for the light sensor in order to reduce the sensing field of view of the light sensor, especially in a vertical plane. This makes the sensor less sensitive to the position of the cover with respect to the passenger compartment.

According to another aspect of the invention, a vehicle automatic rearview mirror system is provided with headlight activation control for establishing a reflectivity level of an electrochromic rearview mirror element and for activating a vehicle's headlights at low light conditions and deactivating the vehicle's headlights at high light conditions in a vehicle having a passenger compartment which has a portion that is selectively covered by a cover. The system includes at least two light sensors and an electro-optic mirror element drive circuit that is responsive to light to which the light sensors are exposed for establishing a partial reflectivity level for the vehicle's electro-optic rearview mirror element as a function of the light and a first sensitivity value. The system further includes a headlight activation control that is responsive to light to which the light sensors are exposed for activating the vehicle's headlights under low light conditions and deactivating the vehicle's headlights under high light conditions as a function of the light and a second sensitivity value. Both the circuit and the control are responsive to the position of the cover with respect to the passenger compartment to adjust the respective sensitivity values. By adjusting the sensitivity values, the control compensates for uncovering of the passenger compartment as occurs by placing a convertible top or a sunroof in an open position. The system may further be enhanced by defining an aperture for one of the light sensor, or sensors, in order to reduce the sensing field of view of the light sensor. This reduction in the sensing field of view, particularly in the vertical plane, in combination with the unique features of a light-responsive vehicle control that is provided according to other aspects of the invention, overcomes the difficulties of the prior art.

These and other objects, advantages and features of this invention will become apparent upon review of the following specification in conjunction with the drawings.

DESCRIPTION OF THE PREFERRED EMBODIMENT

Figure 1:
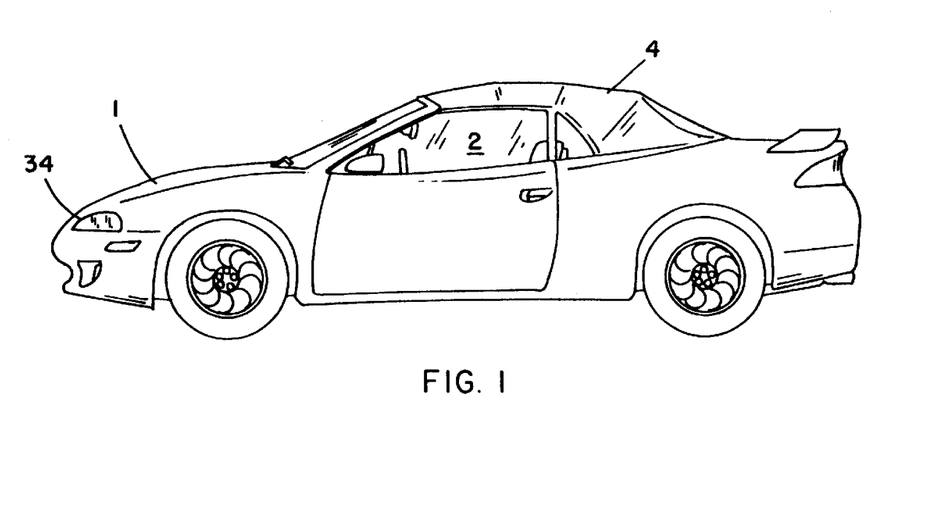
FIG. 1 is a side elevation of a convertible top vehicle incorporating a light-responsive vehicle control according to the invention.

Referring now specifically to the drawings, and the illustrative embodiments depicted therein, a vehicle 1, which is illustrated as an automobile, but also may be a sport utility vehicle, van, minivan, light truck, or the like, is illustrated having a passenger compartment 2 which is removably covered by a movable cover, or a top 4. In the illustrated embodiment, top 4 is a convertible top which may be lowered to the position illustrated in FIG. 2, in which case compartment 2 is completely uncovered. Alternatively, cover 4 may be a sunroof, in which case, opening of the cover partially opens the passenger compartment. Alternatively, vehicle 1 may include chromogenic glazing, such as an electrochromic, photochromic or liquid crystal, sunroof, back light, side windows, or the like, that vary in light transmission. Such chromogenic glazing may affect the level of light entering passenger compartment 2 from outside the vehicle as the level of light transmission varies and thereby, alters the configuration of the vehicle with respect to light sensed within the passenger compartment.

Figure 3:
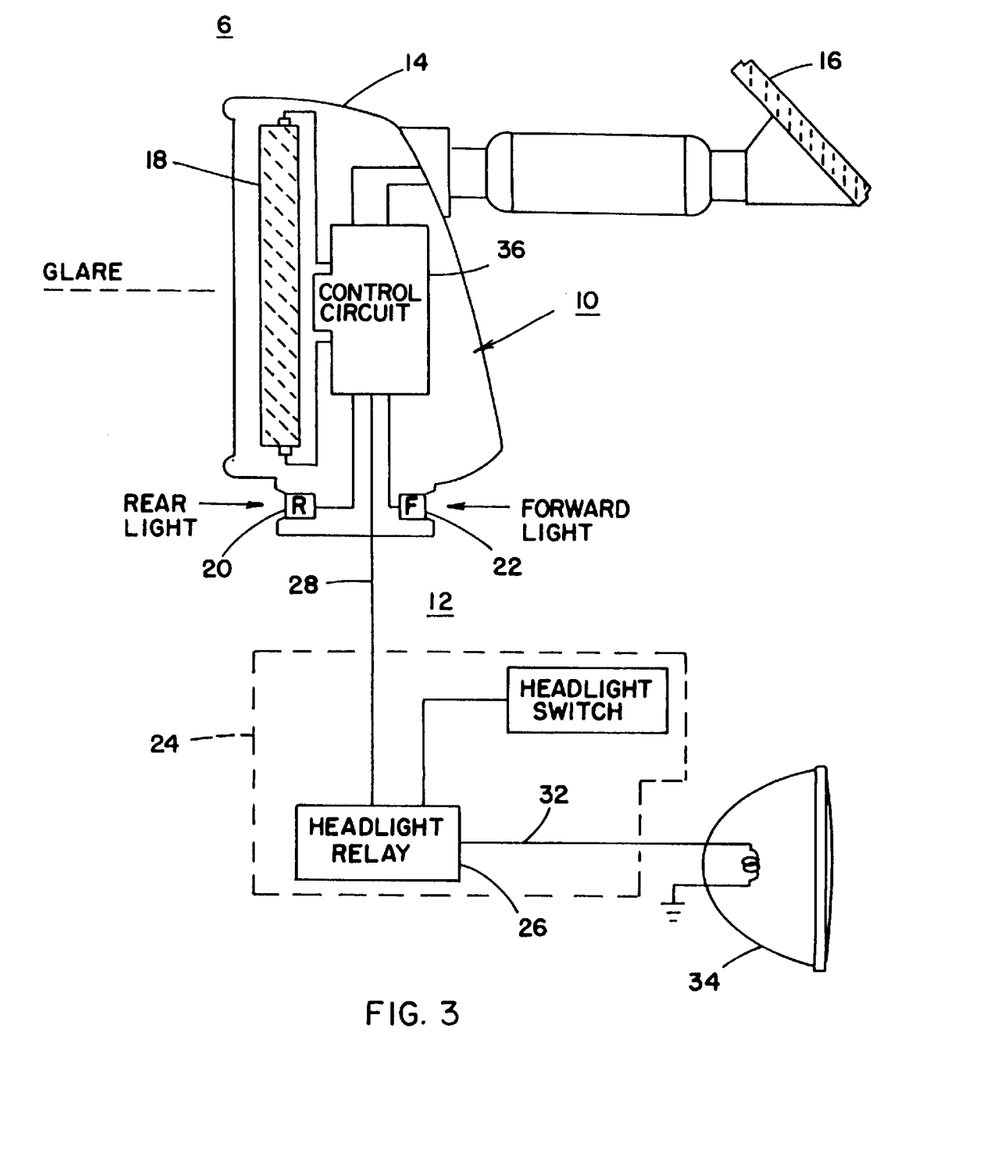
FIG. 3 is a block diagram illustrating application of a light-responsive vehicle control according to the invention to components of the vehicle.

Vehicle 1 also includes a light-responsive vehicle control, generally illustrated at 6 which is located, at least in part, within compartment 2. In the illustrated embodiment, light-responsive vehicle control 6 is positioned within a housing 14 of an interior rearview mirror 10. However, light-responsive vehicle control 6 can be located in other portions of passenger compartment 2. In the illustrated embodiment, light-responsive vehicle control 6 is a combined automatic rearview mirror system and headlight activation control 12 which establishes a partial reflectance level of an electro-optic reflective element 18 and determines the activation state of the headlights 34 of vehicle 1. The details of automatic rearview mirror and headlight activation system 12 are disclosed in detail in commonly assigned United States patent application Ser. No. 08/277,674, filed Jul. 19, 1994, by Kenneth L. Schierbeek and Niall R. Lynam for an AUTOMATIC REARVIEW MIRROR SYSTEM WITH AUTOMATIC HEADLIGHT ACTIVATION, the disclosure of which is hereby incorporated herein by reference and will not be repeated herein. Suffice it to say, system 12 includes a mirror reflectivity and headlight activation control 36 which produces a coloration signal at 38 in order to color an electro-optic mirror element 18 to a partial reflectance level. Mirror reflectivity and headlight activation control 36 additionally produces a signal on line 28 which is provided as an input to a headlight activation circuit 24. Headlight activation circuit 24, in turn, changes the activation state of headlights 34, such as between an OFF condition during high light levels and an ON condition during low light levels or between a daylight-running condition during high light levels and a nighttime operation condition during low light conditions.

Light-responsive vehicle control 6 additionally includes at least one light sensor within passenger compartment 2. In the illustrated embodiment, light-responsive vehicle control 6 includes a light sensor 20, which faces rearward with respect to the direction of travel of vehicle 1, and a light sensor 22, which faces forward with respect to the direction of travel of vehicle 1. Light sensors 20, 22 provide inputs to mirror reflectivity and headlight activation control 36 in order to control the partial reflectance level of electro-optic mirror element 18 and the activation state of vehicle headlights 34.

Figure 4:
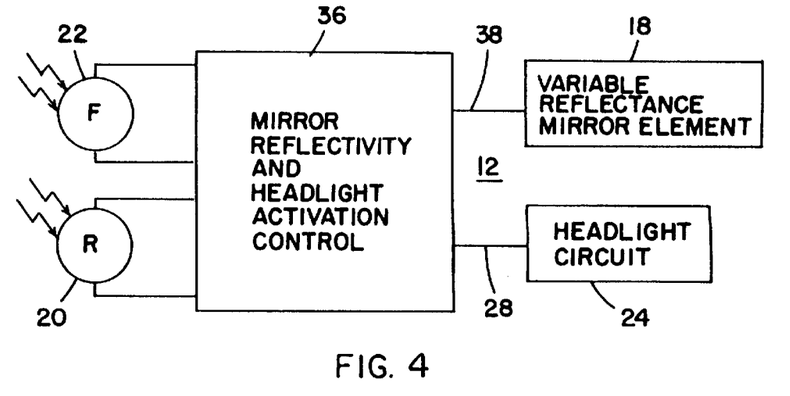
FIG. 4 is a block diagram of an electrical control for the system in FIG. 3.
Figure 5:
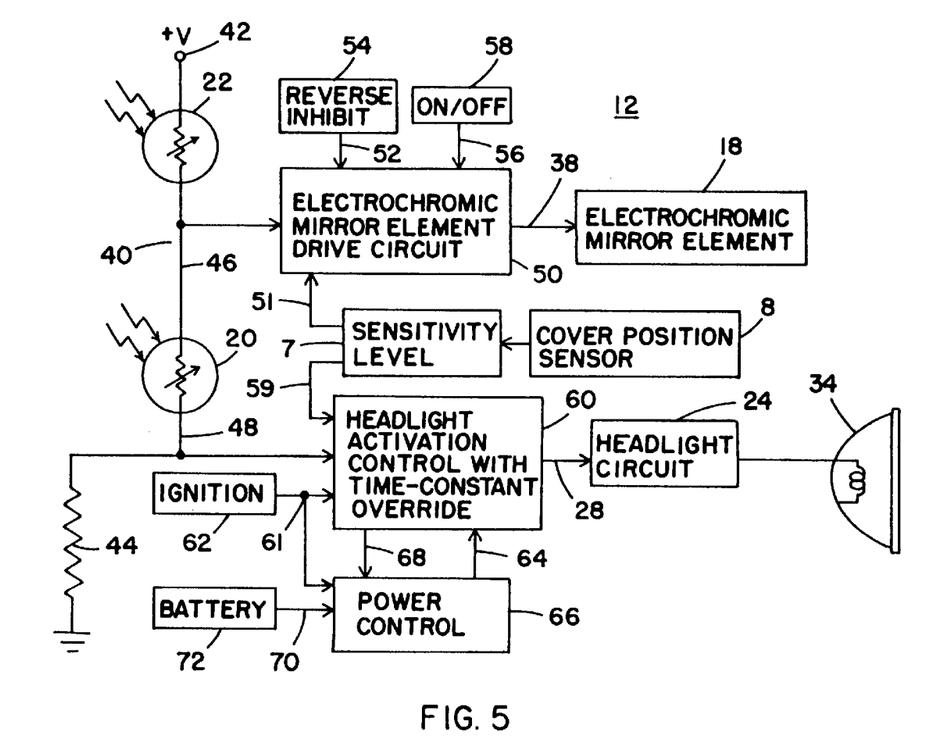
FIG. 5 is a combined schematic diagram and block diagram of an embodiment of the electrical control in FIG. 4.
Figure 6:
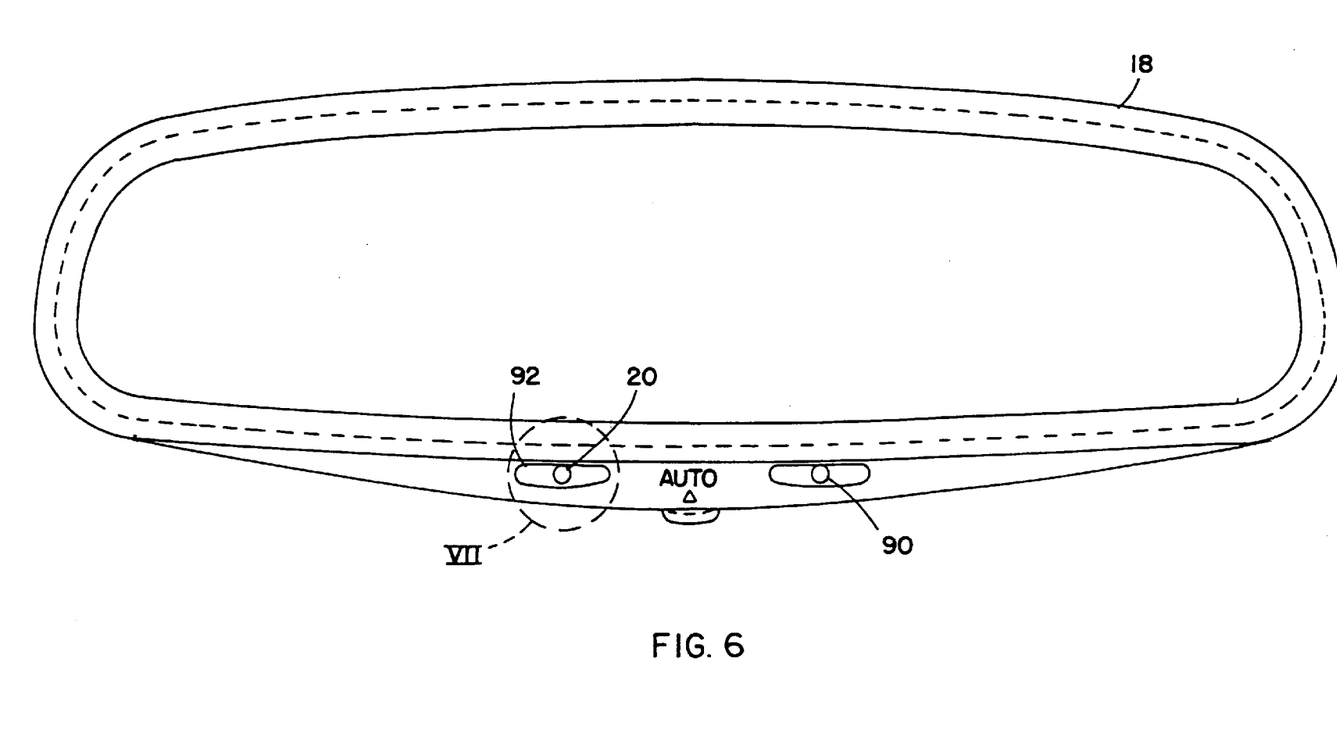
FIG. 6 is an elevation of an electro-optic rearview mirror incorporating the invention, viewed from a position rearward of the vehicle.
Figure 7:
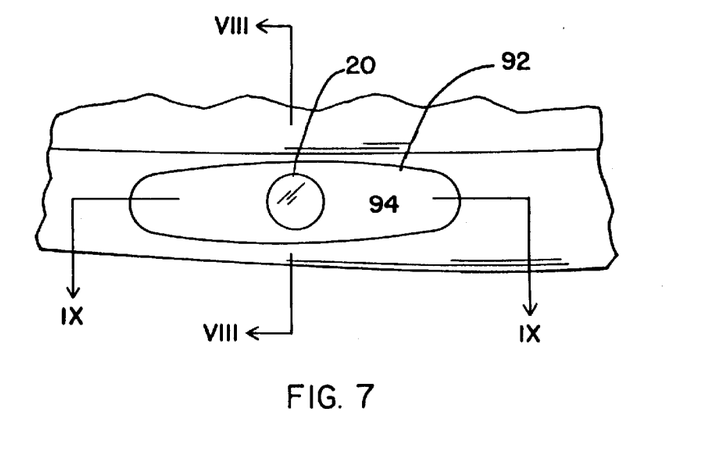
FIG. 7 is an enlarged view of the area designated VII in FIG. 6.
Figure 8:
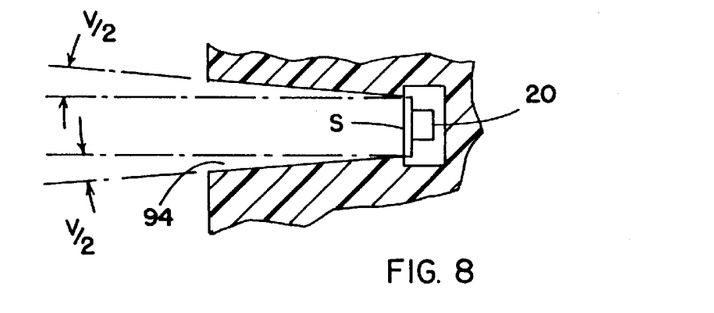
FIG. 8 is a sectional view taken along the lines VIII—VIII in FIG. 7.

In the illustrated embodiment, forward-facing light sensor 22, rearward-facing light sensor 20, and a resistor 44 are connected in a voltage divider 40 in electrical series connection between a voltage source 42 and ground. The signal on node 46 between forward light sensor 22 and rearward-facing light sensor 20 is supplied as an input to an electro-optic mirror element drive circuit 50 which supplies coloration signal 38 to electro-optic mirror element 18. The signal on node 48 between rearward-facing light sensor 40 and resistor 44 is supplied as an input to a headlight activation control 60 which produces a signal at 28 as an input to headlight activation circuit 24. Mirror element drive circuit 50 may additionally receive an input 52 from a reverse inhibit switch 54 which forces electro-optic mirror element 18 to a high reflectance level when the vehicle is placed in reverse gear and an input 56 from an ON/OFF switch 58. Headlight activation control 60 may additionally receive an input 61 from the vehicle's ignition 22 and an input 64 from a power control 66 which responds to input 61 and input 70 from the vehicle's battery 72 in order to determine when the vehicle has been switched to an OFF condition in order to delay deactivation of headlights 34. Headlight activation control 60 may additionally produce an input 68 to power control 66 in order to inform power control 66 of the activated state of the headlights upon powering down of vehicle 1.

Automatic rearview mirror and headlight activation system 10 additionally includes a sensitivity level circuit 7 which establishes a sensitivity level 51 for mirror element drive circuit 50 and a sensitivity level 59 for headlight activation control 60. Mirror element drive circuit 50 responds to the signal level at node 46 as a function of the sensitivity level 51 established by sensitivity level circuit 7 in establishing the value of coloration signal 38 supplied to mirror element 18. Likewise, headlight activation control 60 responds to the signal at node 48 as a function of the sensitivity level 59 established by sensitivity level circuit 7 in determining whether to switch headlights 34 between an activated and a deactivated state. In general, for a given lighting condition sensed by light sensors 20, 22, mirror element drive circuit 50 will produce a coloration signal 38 which colors electro-optic mirror element 18 to a lower reflectivity level in response to increases in sensitivity level 51 produced by sensitivity level 7 and vice versa. In general, headlight activation control 60 will produce an input 28 to headlight control 24 to switch headlights 24 to an activated, or a nighttime, condition for lower light levels sensed by sensors 20, 22 for increases in sensitivity level 59 produced by sensitivity level circuit 7, and vice versa.

Sensitivity level circuit 7 receives an input from a cover position sensor 8 which indicates the position of cover 4 with respect to passenger compartment 2. Cover position sensor 8 causes sensitivity level circuit 7 to reduce sensitivity levels at inputs 51, 59 in response to a detection that cover 4 is in a position illustrated in FIG. 2 uncovering passenger compartment 2. In contrast, when cover position sensor 8 senses that cover 4 is in the position illustrated in FIG. 1, covering passenger compartment 2, sensitivity level circuit 7 responds by returning sensitivity level inputs 51, 59 to a higher sensitivity level. In this manner, light-responsive vehicle control 6 responds to cover 4 being placed in the position illustrated in FIG. 2, uncovering passenger compartment 2, by reducing the sensitivity level of automatic rearview mirror and headlight activation system 12 in order to compensate for increased light levels to which light sensors 20 and 22 are exposed. In this manner, mirror element drive circuit 50 will produce a coloration signal 38 establishing the partial reflectance level of electro-optic mirror element 18 which is less subject to variation resulting from the position of cover 4 with respect to passenger compartment 2. Likewise, headlight activation control 60 will switch headlights 34 between an activated and a deactivated condition for light levels around vehicle 1 with less variation resulting from the position of cover 4 with respect to passenger compartment 2.

In the illustrated embodiment, cover position sensor 8 is a mechanical switch closure which changes states in response to the position of cover 4 with respect to passenger compartment 2. Alternatively, the position of cover 4 could be determined by a magnetic sensor, such as a Hall effect or a reed switch, responding to metal in the framework (not shown) supporting cover 4, in order to determine the position of the cover. Likewise, cover position sensor 8 may be an optical sensor within passenger compartment 2 responding to an increase in light levels, generally upwardly of passenger compartment 2, in order to detect cover 4 being placed in a position uncovering passenger compartment 2. Other cover position sensors will be apparent to those skilled in the art.

Figure 9:
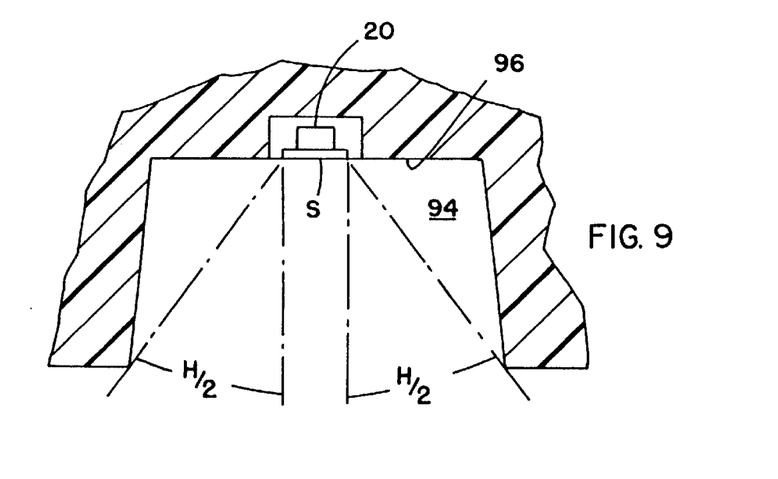
FIG. 9 is a sectional view taken along the lines IX—IX in FIG. 7.

Electro-optic reflective element 18 may include an indicator 90, which forms no part of the present invention, in order to indicate to the driver the operative state of system 12 (FIGS. 6–9). Rearward-facing light sensor 20 includes an aperture-defining means 92 which restricts the field of view of rearward-facing sensor 20 to a vertical field of view V (FIG. 8) and a horizontal field of view H (FIG. 9). Because sensor 20 has a finite sensing surface S, each field of view V, H is twice the angle between the outer edge of surface S and the angle of the adjacent wall of cavity 94. In particular, aperture-defining means 92 restricts the vertical field of view V of sensor 20 in a vertical plane to a much lower field of view than a horizontal field of view H in a horizontal plane, as best seen by comparing FIGS. 8 and 9. By restricting field of view V, light coming into passenger compartment 2 with cover 4 in a position uncovering the passenger compartment has less of an effect on sensor 20. However, field of view H is still relatively wide in order to respond to vehicle headlights which may appear through the sides of vehicle 1. In the illustrated embodiment, vertical field of view V is preferably less than approximately fifteen (15) degrees and most preferably less than approximately seven (7) degrees. In the illustrated embodiment, horizontal field of view H is preferably less than approximately one hundred (100) degrees and most preferably less than approximately seventy (70) degrees. In the illustrated embodiment, aperture-defining means 92 is a cavity 94 with sensor 20 positioned at a rear surface 96 of the cavity. In this manner, only light within field of views V and H will, in general, be sensed by sensor 20. Reflection off the walls defining cavity 74 may be reduced by providing non-reflective surfaces as are known in the art.

Figure 10:
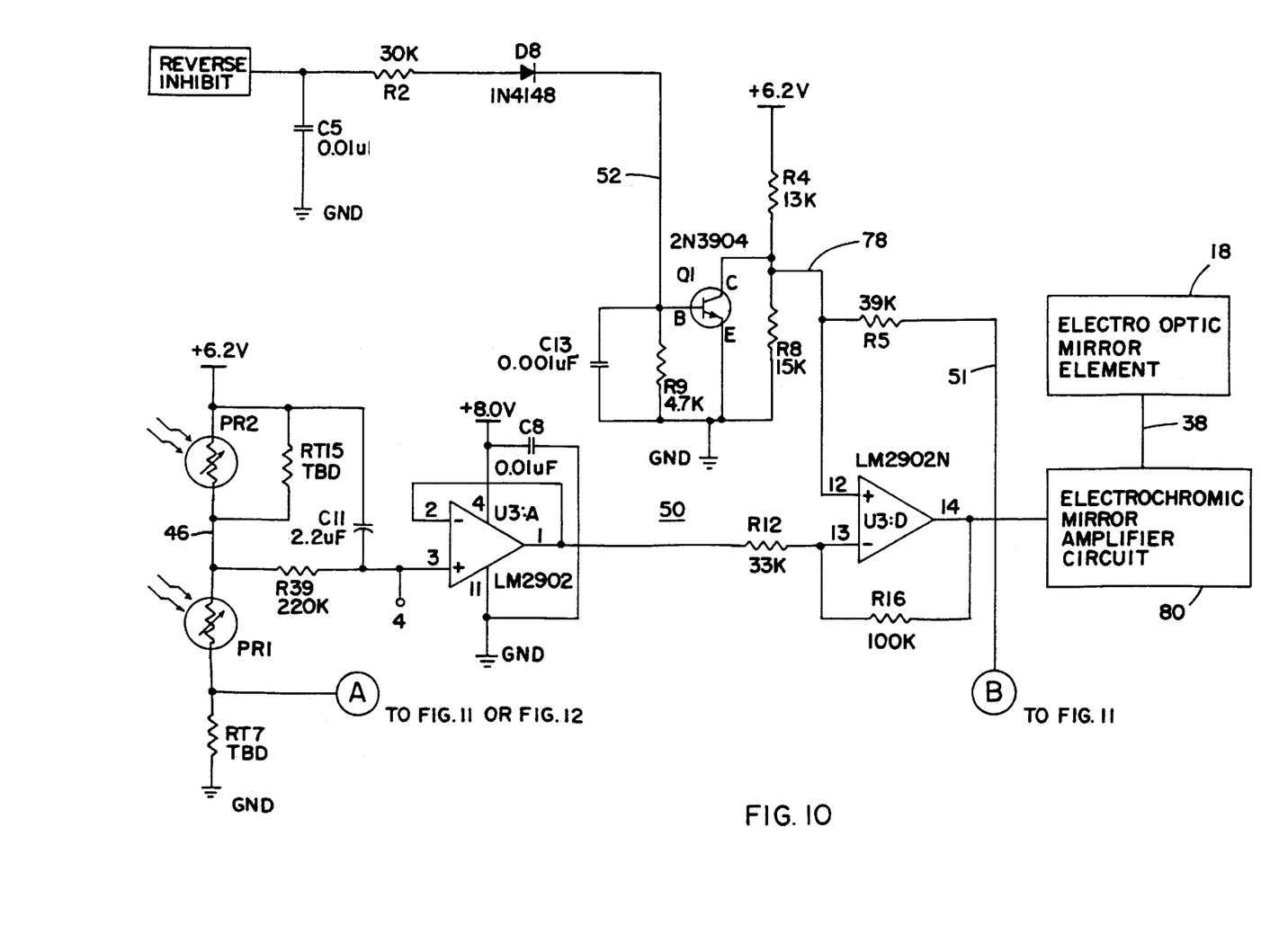
FIG. 10 is an electrical schematic diagram of a portion of the circuit controlling the electrochromic mirror partial reflectance level.

In the illustrated embodiment, electrochromic mirror element drive circuit 50 includes a buffer amplifier U3:A having an inverting input connected in a unity gain feedback loop and a non-inverting input connected with node 46 through a resistor R39 (FIG. 10). The output of amplifier U3:A is supplied through a resistor R12 to the inverting input of an amplifier U3:D whose gain is set by a feedback resistor R16 in combination with resistor R12. In the illustrated embodiment the gain is set at 3. The non-inverting input of amplifier U3:D is connected with a reference node 78, which is normally maintained at a fixed level by a voltage divider composed of resistors R4 and R8 in electrical series connection between a 6.2-volt source and ground. Reference node 78 may be selectively forced to a lower level by a transistor Q1 in response to a reverse-inhibit signal supplied on input 52 from reverse-inhibit circuit 54. If reverse-inhibit voltage 52 is activated, the output of amplifier U3:D is clamped at ground. Otherwise, the output of amplifier U3:D is equal to the sum of the voltage at node 78 and a number obtained from gain factor multiplied by the difference between the reference voltage at node 78 and the input voltage at node 46. The output of amplifier U3:D is supplied to an electrochromic mirror element amplifier circuit 80 which functions in the manner described in the Schierbeek et al. patent application, previously referred to, in order to produce a coloration voltage 38 supplied to electro-optic mirror element 18.

Figure 11:
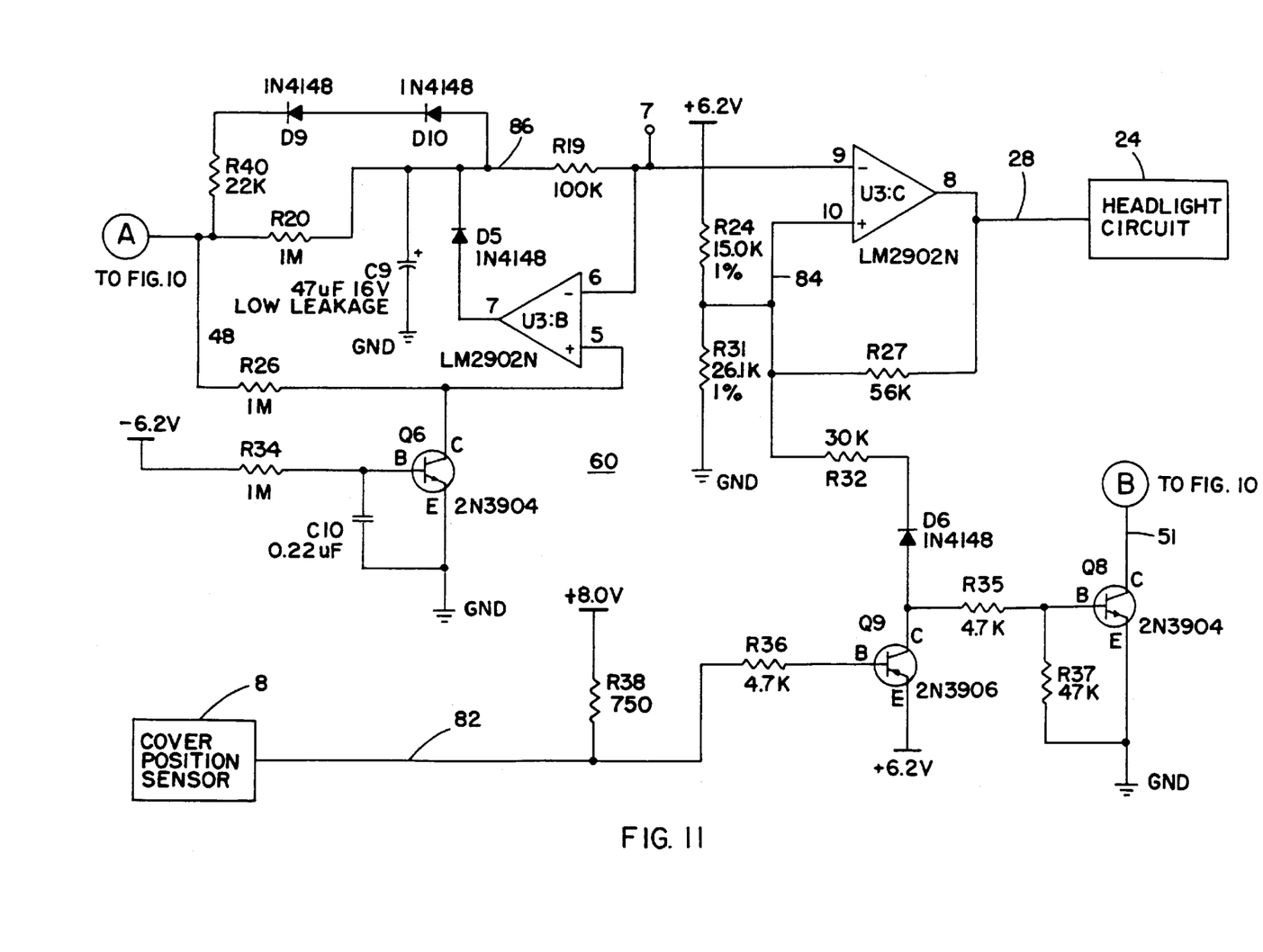
FIG. 11 is a portion of the control circuit controlling the activation of the vehicle's headlights.

The voltage level at node 78 may additionally be reduced by a sensitivity input 51 which is received from a transistor Q8, whose emitter is connected with ground and whose collector is connected through a resistor R5 to reference node 78 (FIG. 11). When transistor Q8 is switched into a conducting state, line 51 is pulled to ground which reduces the voltage level on node 78. This has the effect of reducing the sensitivity of amplifier U3:D because a reduction in the voltage at node 78 will decrease the value of coloration signal 38 produced by drive circuit 80 for a given voltage at node 46.

Figure 2:
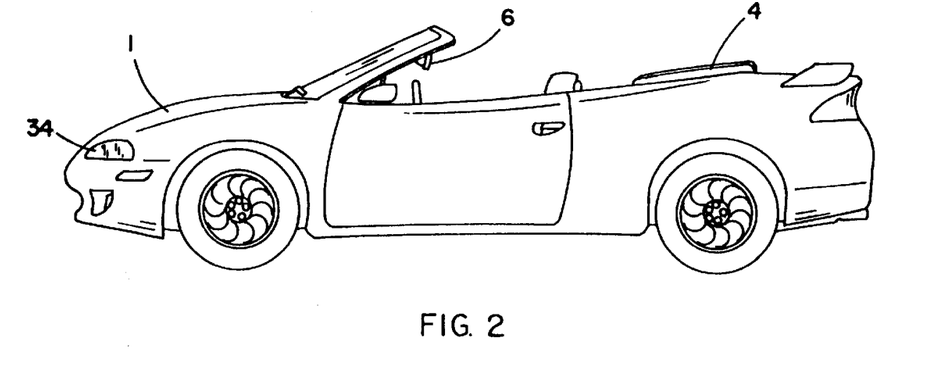
FIG. 2 is the same view as FIG. 1 with the convertible top in a open position uncovering the passenger compartment.

The base of transistor Q8 is connected through a resistor R35 to the collector of an NPN transistor Q9 whose emitter is connected with a 6.2-volt source and whose base is connected through a resistor R36 to a line 82. Line 82 is responsive to the output of cover position sensor 8. Line 82 is connected with a pull-up resistor R38 which is also connected with an 8-volt source. In this manner, if cover position sensor 8 is an open-circuit condition, resistor R38 pulls line 82 to a positive voltage level which switches transistor Q9 into a non-conducting state. This lowers the voltage on the base of transistor Q8 which is switched to a non-conducting state which does not affect the sensitivity level of mirror element drive circuit 50. Cover position sensor 8 is in such open-circuit state when cover 4 is covering passenger compartment 2 of vehicle 1 as illustrated in FIG. 1. In contrast, when cover position sensor 8 switches to a short-circuit condition in response to cover 4 being in the position uncovering passenger compartment 2, as illustrated in FIG. 2, line 82 is pulled to ground. This causes transistor Q9 to become conducting which causes transistor Q8 to be conducting. This lowers the sensitivity level of electro-optic mirror drive circuit 50 by reducing the voltage level of node 78 by approximately 0.5 volts through the path of resistor R5 to ground through transistor Q8.

The collector of transistor Q9 is connected through a diode D6 and a resistor R32 to a reference node 84 which is connected with the non-inverting input of an amplifier U3:C of headlight activation control 60. The inverting input of amplifier U3:C is connected through a resistor R19 to a node 86 and, in turn, through resistor R20 to node 48 of voltage divider 40. Light signal from node 40 is, under most conditions, is filtered at node 86 by a capacitor C9 at a time-constant of several tens of seconds, such as 30 seconds, by the combined value of resistor R20 and capacitor C9. Amplifier U3:C produces a low state on its output 28 supplied to headlight circuit 24, to deactivate the headlights, if the filtered voltage supplied at its inverting input is above the reference voltage at node 84 supplied to its non-inverting input, which occurs during high ambient light levels. Accordingly, the reference voltage at node 84 establishes a sensitivity level of headlight activation control circuit 60. When transistor Q9 is in a non-conducting state, the voltage level at node 84 is established by a voltage divider composed of resistors R24 and R31 connected between a 6.2-volt DC source and ground. When transistor Q9 is switched to a conducting state, in response to cover position sensor 8 sensing that cover 4 is in a position not covering passenger compartment 2, as illustrated in FIG. 2, the voltage at level 84 is increased, which reduces the sensitivity level of headlight activation control 60 by requiring a greater level of sensed light in order to switch headlights 34 to a deactivated state.

Headlight activation control 60 includes a time-constant override. The control normally filters light sensed by light sensors 20, 22 according to a time-constant which, in the illustrated embodiment, is set to several tens of seconds, such as 30 seconds. As previously set forth, this time-constant is set by resistor R20 and capacitor C9. Headlight activation control 60 includes a time-constant override that is responsive to a reduction in the light level sensed by light sensors 20, 22 in order to reduce the value of the time-constant. Control 60 includes a pair of serially connected diodes D9 and D10 which are connected through a resistor R40 between nodes 48 and 86. When one or both light sensors 20, 22 experience an abrupt decrease in light around vehicle 1, the voltage at junction 48 will decrease. If the voltage level at junction 48 decreases sufficiently, diodes D9 and D10 will become forward-biased by the voltage across capacitor C9 which will discharge capacitor C9 through resistor R40. Because of its relatively low resistance, the time-constant of resistor R40 in combination with capacitor C9 is much less than that of resistor R20 in combination with capacitor C9. This causes capacitor C9 to rapidly discharge which allows amplifier U3:C to switch headlights 34 to a nighttime activation condition in a substantially reduced time. In the illustrated embodiment, the time-constant of capacitor C9 and resistor R40 is on the order of approximately two seconds. Therefore, when vehicle 1 enters a tunnel, or other dark location, headlights 34 will be activated, or set to a night condition, very rapidly.

Headlight activation control 60 includes a startup circuit to control its operation when the vehicle is initially turned on. This includes an amplifier U3:B having an output connected through a diode D5 to node 86, a non-inverting input connected through a resistor R26 to node 48, and an inverting input connected through resister R19 to capacitor C9 and with the inverting input of amplifier U3:C. After the vehicle has been started, the voltage level at the inverting input of amplifier U3:B, which is filtered according to the time-constant established by resistor R20 and capacitor C9, is less than the voltage level of the non-inverting input of amplifier U3:B and the output of amplifier U3:B is at a low state. Upon power initially being applied to headlight activation control circuit 60, capacitor C10, connected across the base to the emitter junction of a transistor Q6 whose collector is connected with the non-inverting input of amplifier U3:B, is fully discharged so that transistor Q6 is non-conducting. This allows the non-inverting input of amplifier U3:B to momentarily be greater than its non-inverting input. This causes amplifier U3:B to produce a high state on its output which causes capacitor C9 to charge rapidly through diode D5 until the voltage at the inverting input of amplifier U3:B is equal to the voltage on node 48. At such time, amplifier U3:B switches its output to a low state condition which initiates long duration time filtering of the signal at node 48. In order to lock-out amplifier U3:B during operation of the vehicle, capacitor C10 rapidly charges which switches transistor Q6 to a conducting state. This forces the non-inverting input of amplifier U3:B to a low state which, thereafter, inhibits the amplifier from switching its output to a high state.

Figure 12:
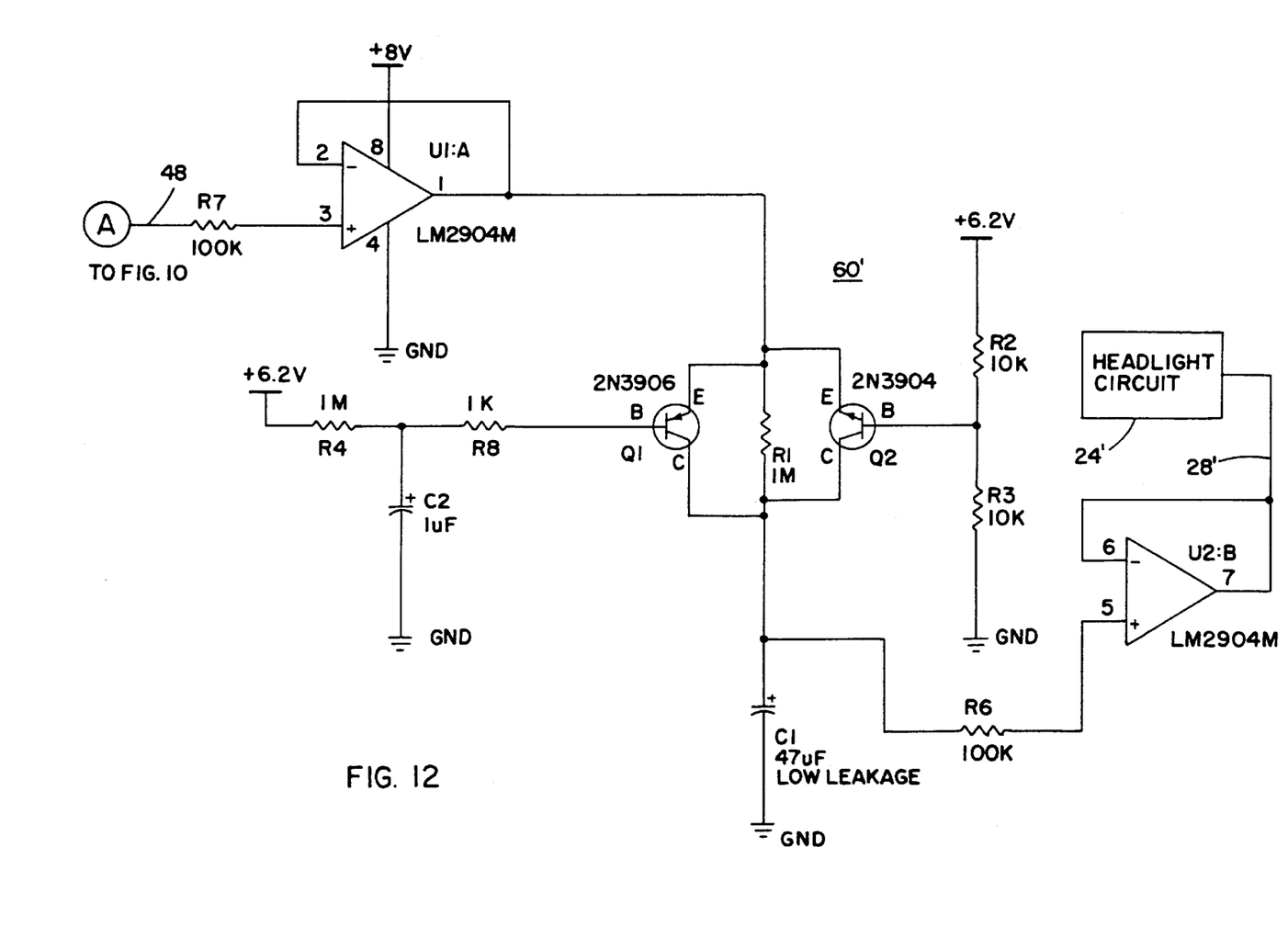
FIG. 12 is an alternative embodiment of a control circuit for controlling the activation state of the vehicle's headlights.

An alternative embodiment of a headlight activation control 60' with time-constant override is illustrated in FIG. 12. In contrast with headlight activation control 60, which provides a reduction in the length of the time-constant in proportion to the amount of reduction in the sensed ambient light level, headlight activation control 60' does not affect the reduction in time-constant of filtration of the sensed ambient light level until a particular set point is reached in decreasing light levels. Control 60' will then begin to alter the time-constant of filtration at such point. Referring to FIG. 12, a buffer amplifier U1:A receives the voltage signal at junction 48, representative of sensed light level, buffers the signal, and applies that signal to a filter made up of a resistor R1 and a capacitor C1. The time-constant of filtration is on the order of several tens of seconds. A transistor Q2 has a base connected to a fixed voltage level established by a voltage divider made up of resistors R2 and R3 connected between a 6.2-volt DC source and ground. Whenever the voltage at junction 48 drops more than a base-emitter forward bias below a voltage established by the set point determined by resistors R2 and R3, transistor Q2 becomes conducting which bypasses resistor R1 such that the time-constant of filtration is established by the resistance of transistor Q2, which is negligible, and capacitor C1. This time-constant is much less than the time-constant established by resistor RI and capacitor C1. Thus, when the light level sensed by one or both light sensors 20, 22 decreases below a particular level, the time period of filtration is substantially shortened such that the lights, which are controlled in response to an output of a buffer amplifier U2:B, are switched on more rapidly. A transistor Q1, whose base is connected through series resistors R4 and R8 to a 6.2-volt DC source, is momentarily actuated upon vehicle start-up because capacitor C2, which is connected between resistors R4 and R8 and signal ground, is discharged. This allows capacitor C1 to rapidly charge to the voltage level at node 48. After a brief period of time, capacitor C2 becomes fully charged and transistor Q1 becomes open-circuited, allowing normal operation of the time-filtering circuit until the vehicle is again turned off and back on.

Thus, it is seen that the present invention overcomes many difficulties associated with light-responsive vehicle controls having at least one light sensor within the passenger compartment of a vehicle. Overcoming these difficulties provides superior performance and, therefore, greater acceptance in the marketplace. Although the invention is disclosed as applied to a combined mirror reflectivity and headlight activation control, its principles apply to any light-responsive vehicle control, such as a mirror reflectivity control which controls only the partial reflectance level of an electro-optic rearview mirror. Likewise, its principles apply to a more conventional headlight activation control, including the type which utilizes a single light sensor facing in directions other than rearward of the vehicle. Activation and deactivation of the vehicle's headlights may also affect other vehicle lights such as the parking lights. A reduction in sensitivity levels in response to the position of the vehicle's cover may be applied to a sensitivity level that is otherwise fixed or is adjustable, either manually by the driver or by the control.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A light-responsive vehicle control for a vehicle having a passenger compartment and a cover selectively covering at least a portion of said passenger compartment, comprising:
   at least one light sensor within the passenger compartment; and
   a control receiving an input from said at least one light sensor and producing an output to operate a device, said output being a function at least of light sensed by said light sensor and a sensitivity value;
   wherein said control is responsive to the position of the cover with respect to the passenger compartment to adjust said sensitivity value.

2. The light-responsive vehicle control in claim 1 wherein said output is a drive signal establishing a partial reflectance level of an electro-optic mirror.

3. The light-responsive vehicle control in claim 2 wherein said electro-optic mirror is an electrochromic mirror.

4. The light-responsive vehicle control in claim 2 wherein said light sensor is facing generally rearwardly of the vehicle.

5. The light-responsive vehicle control in claim 4 including another light sensor sensing light in a different direction than said light sensor wherein said output is a function of light sensed by both of said light sensors.

6. The light-responsive vehicle control in claim 5 wherein said another light sensor is directed generally forwardly of the vehicle.

7. The light-responsive vehicle control in claim 1 wherein said output is a headlight control signal establishing a state of operation of the vehicle's headlights.

8. The light-responsive vehicle control in claim 7 including another light sensor sensing light in a different direction than said light sensor wherein said output is a function of light sensed by both of said light sensors.

9. The light-responsive vehicle control in claim 8 wherein said light sensor is facing generally rearwardly of the vehicle.

10. The light-responsive vehicle control in claim 8 wherein said another light sensor is directed generally forwardly of the vehicle.

11. The light-responsive vehicle control in claim 7 wherein said control responds to a signal that is a function light sensed by said light sensor and filters said signal according to a time-constant and wherein said control is responsive to a reduction in the light level sensed by said light sensor to reduce the value of said time-constant.

12. The light-responsive vehicle control in claim 11 wherein said control reduces the value of said time-constant substantially in proportion to the reduction in said light level.

13. The light-responsive vehicle control in claim 11 wherein said control reduces the value of said time-constant in response to a predetermined reduction in said light level.

14. The light-responsive vehicle control in claim 11 wherein said control reduces the value of said time-constant in response to said light level being reduced to a fixed level.

15. The light-responsive vehicle control in claim 1 wherein said light sensor is directed generally rearwardly of the vehicle.

16. The light-responsive vehicle control in claim 15 including a surface defining an aperture for said light sensor in order to reduce the sensing field of view of said light sensor.

17. The light-responsive vehicle control in claim 16 wherein said sensing field of view is less than approximately 15 degrees in a vertical plane.

18. The light-responsive vehicle control in claim 17 wherein said sensing field of view is less than approximately 7 degrees in a vertical plane.

19. The light-responsive vehicle control in claim 1 wherein the cover is one of a sunroof and a convertible top.

20. The light-responsive vehicle control in claim 19 wherein the cover is a convertible top.

21. The light-responsive vehicle control in claim 1 wherein said control lowers said sensitivity in response to the cover being in an open position.

22. A vehicle headlight activation control for activating a vehicle's headlight at low ambient light conditions and deactivating the vehicle's headlights at high ambient light conditions, comprising:
   at least one light sensor; and
   a control receiving an input from said at least one light sensor, and producing an output to operate the vehicle's headlights as a function at least of a time-filtered signal that is a function of light sensed by said light sensor, said signal being filtered according to a time-constant in order to provide a delay between changes in light level sensed by the at least one light sensor and changes in the operational state of the headlights;
   wherein said time-constant has a first time-constant value and a second time-constant value that is lower than said first time-constant value;
   wherein said control includes a time-constant override which is responsive to a reduction in the light level sensed by said light sensor to switch the value of said time-constant from said first time-constant value to said second time-constant value in order to activate the vehicle's headlights in less time than would have resulted from activation of the vehicle's headlights with said first time-constant.

23. The vehicle headlight activation control in claim 22 wherein said control reduces the value of said second time-constant value substantially in proportion to the reduction in said light level.

24. The vehicle headlight activation control in claim 22 wherein said control reduces the value of said time-constant in response to a predetermined reduction in said light level.

25. The vehicle headlight activation control in claim 22 wherein said control deactivates the vehicles's headlights to one of an OFF condition and a daytime running light condition.

26. A vehicle headlight activation control for activating a vehicle's headlight at low ambient light conditions and deactivating the vehicle's headlights at high ambient light conditions, comprising:
   at least one light sensor; and
   a control receiving an input from said at least one light sensor and producing an output to operate the vehicle's headlights as a function at least of a time-filtered signal that is a function of light sensed by said light sensor, said signal being filtered according to a time-constant;
   wherein said control is responsive to a reduction in the light level sensed by said light sensor to reduce the value of said time-constant;
   wherein the vehicle includes a passenger compartment and a cover selectively covering at least a portion of said passenger, wherein said control operates the vehicle's headlights as a function of light sensed by said light sensor and a sensitivity value and wherein said control is responsive to the position of the cover with respect to the passenger compartment to adjust said sensitivity value.

27. A vehicle automatic rearview mirror system for establishing a partial reflectance level of an electro optic rearview mirror element positioned in a passenger compartment, the passenger compartment having a portion which is selectively covered by a cover, comprising:
- a pair of light sensors within the passenger compartment, at least one of said sensors facing generally rearwardly of the vehicle;
- a control receiving input from said light sensors and producing a drive signal establishing a partial reflectance level of the electro-optic mirror, said drive signal being a function at least of light sensed by said light sensors and a sensitivity value;
- wherein said control is responsive to the position of the cover with respect to the passenger compartment to adjust said sensitivity value.

28. The mirror system in claim 27 wherein said electro-optic mirror is an electrochromic mirror.

29. The mirror system in claim 27 including a surface defining an aperture for said one of said light sensors in order to reduce the sensing field of view of said one of said light sensors.

30. The mirror system in claim 29 wherein said sensing field of view is less than approximately 15 degrees in a vertical plane.

31. The mirror system in claim 30 wherein said sensing field of view is less than approximately 7 degrees in a vertical plane.

32. The mirror system in claim 27 wherein the cover is one of a sunroof and a convertible top.

33. The mirror system in claim 32 wherein the cover is a convertible top.

34. The mirror system in claim 27 wherein said control lowers said sensitivity in response to the cover being in an open position.

35. A vehicle automatic rearview mirror system with headlight activation control for establishing a reflectivity level of an electro-optic rearview mirror element and for activating a vehicle's headlights at low light conditions and deactivating the vehicle's headlights at high light conditions, in a vehicle including a passenger compartment having a portion which is selectively covered by a cover, comprising:
- at least two light sensors;
- an electro-optic mirror element drive circuit that is responsive to light to which said light sensors are exposed for establishing a partial reflectivity level for the vehicle's electro-optic rearview mirror element as a function of the light and a first sensitivity value; and
- a headlight activation control that is responsive to light to which said light sensors are exposed for activating the vehicle's headlights under low light conditions and deactivating the vehicle's headlights under high light conditions as a function of the light and a second sensitivity value;
- wherein said circuit and said control are responsive to the position of the cover with respect to the passenger compartment to adjust said sensitivity values.

36. The mirror system in claim 35 wherein said electro-optic mirror is an electrochromic mirror.

37. The mirror system in claim 35 wherein one of said light sensors is facing generally rearwardly of the vehicle.

38. The mirror system in claim 37 wherein the other of said light sensors senses light in a different direction than said one of said light sensors.

39. The mirror system in claim 38 wherein said other of said light sensors is directed generally forwardly of the vehicle.

40. The mirror system in claim 35 including a surface defining an aperture for said one of said light sensors in order to reduce the sensing field of view of said one of said light sensors.

41. The mirror system in claim 37 wherein said sensing field of view is less than approximately 15 degrees in a vertical plane.

42. The mirror system in claim 41 wherein said sensing field of view is less than approximately 7 degrees in a vertical plane.

43. The mirror system in claim 35 wherein the cover is one of a sunroof and a convertible top.

44. The mirror system in claim 43 wherein the cover is a convertible top.

45. The mirror system in claim 35 wherein said control lowers said sensitivity in response to the cover being in an open position.

46. The mirror system in claim 35 wherein said control responds to a signal that is a functional of light sensed by said light sensors according to a time-constant and wherein said control reduces the value of said time-constant in response to a reduction in sensed light.

47. The mirror system in claim 46 wherein said control reduces the value of said time-constant substantially in proportion to the reduction in said light.

48. The mirror system in claim 46 wherein said control reduces the value of said time-constant in response to a predetermined reduction in said light.

49. The mirror system in claim 46 wherein said control reduces the value of said time-constant in response to said light level being reduced to a fixed level.

50. A light-responsive vehicle control for a vehicle having a passenger compartment and a cover selectively covering at least a portion of said passenger compartment, comprising;
- at least one light sensor within the passenger compartment directed generally rearwardly of the vehicle;
- a control receiving an input from said at least one light sensor and producing an output to operate a device as a function at least of light sensed by said light sensor; and
- a surface defining an aperture for said light sensor in order to reduce the sensing field of view of said light sensor in order to make the light sensor less sensitive to the position of the cover with respect to the passenger compartment.

51. The light-responsive vehicle control in claim 50 wherein said output is a drive signal establishing a partial reflectance level of an electro-optic mirror.

52. The light-responsive vehicle control in claim 51 wherein said electro-optic mirror is an electrochromic mirror.

53. The light-responsive vehicle control in claim 52 including another light sensor sensing light in a different direction than said light sensor wherein said output is a function of light sensed by both of said light sensors.

54. The light-responsive vehicle control in claim 53 wherein said another light sensor is directed generally forwardly of the vehicle.

55. The light-responsive vehicle control in claim 50 wherein said output is a headlight control signal establishing a state of operation of the vehicle's headlights.

56. The light-responsive vehicle control in claim 55 including another light sensor sensing light in a different direction than said light sensor wherein said output is a function of light sensed by both of said light sensors.

57. The light-responsive vehicle control in claim 56 wherein said another light sensor is directed generally forwardly of the vehicle.

58. The light-responsive vehicle control in claim 50 wherein said sensing field of view is less than approximately 15 degrees in a vertical plane.

59. The light-responsive vehicle control in claim 58 wherein said sensing field of view is less than approximately 7 degrees in a vertical plane.

60. The light-responsive vehicle control in claim 50 wherein the cover is one of a sunroof and a convertible top.

61. The light-responsive vehicle control in claim 60 wherein the cover is a convertible top.

62. A vehicle headlight activating system for activating a vehicle's headlights at low ambient light conditions and deactivating the vehicle's headlights at high ambient light conditions, in a vehicle including a passenger compartment having a portion which is selectively covered by a cover, comprising;

at least one light sensor within the passenger compartment; and a control receiving an input from said at least one light sensor and producing an output to operate the vehicle's headlights as a function at least of light sensed by said light sensor and a sensitivity value;

wherein said control is responsive to the position of the cover with respect to the passenger compartment to adjust said sensitivity value.

* * * * *